United States Patent [19]

Emgard et al.

[11] 4,204,006
[45] May 20, 1980

[54] METHOD OF THERMALLY TREATING UNPACKAGED FOOD PRODUCTS

[75] Inventors: Lennart Emgård; Alan Lascelles, both of Helsingborg; Lars Eek, Nyhamnsläge, all of Sweden

[73] Assignee: Frigoscandia Contracting AB, Helsingborg, Sweden

[21] Appl. No.: 17,651

[22] Filed: Mar. 5, 1979

Related U.S. Application Data

[63] Continuation of Ser. No. 876,815, Feb. 10, 1978, abandoned.

[30] Foreign Application Priority Data

Feb. 18, 1977 [SE] Sweden .............................. 7701856

[51] Int. Cl.² .............................................. A23L 3/18
[52] U.S. Cl. ....................................... 426/520; 34/33; 34/226; 62/374; 62/380; 99/443 C; 99/516; 165/120; 426/506; 426/524
[58] Field of Search ............... 426/506, 509, 510, 511, 426/520, 524, 521, 523, 412, 393; 99/443 R, 443 C, 516, 517, 536; 62/60, 63, 266, 374, 380; 165/120; 134/131, 154, 182, 183; 34/33, 218, 225, 226

[56] References Cited

U.S. PATENT DOCUMENTS

| | | | |
|---|---|---|---|
| 2,080,103 | 5/1937 | Zarotschenzeff | 62/63 |
| 2,116,738 | 5/1938 | Zarotschenzeff | 62/63 |
| 2,153,742 | 4/1939 | Conn | 62/63 X |
| 3,309,835 | 3/1967 | Peppler | 34/225 X |
| 3,607,312 | 9/1971 | Ready | 426/412 X |
| 3,897,671 | 8/1975 | Higgins | 34/225 X |

*Primary Examiner*—Arthur L. Corbin
*Attorney, Agent, or Firm*—Karl W. Flocks

[57] ABSTRACT

The invention concerns a method for heat treatment of unpackaged food products by means of a fluid, especially a liquid, which has a temperature different from that of the unpackaged products and which supplies heat to the product or remove heat therefrom. The product is placed on a support of high thermal conductivity and is covered by a thin, flexible and fluid-tight covering layer which can be brought to closely follow the product. Upon flushing of such fluid towards the underside of the support and towards the top side of the cover, the fluid is adapted to cause the cover to adhere closely to the products thereby establishing a maximized contact surface for the exchange of heat between the fluid and the products.

4 Claims, 3 Drawing Figures

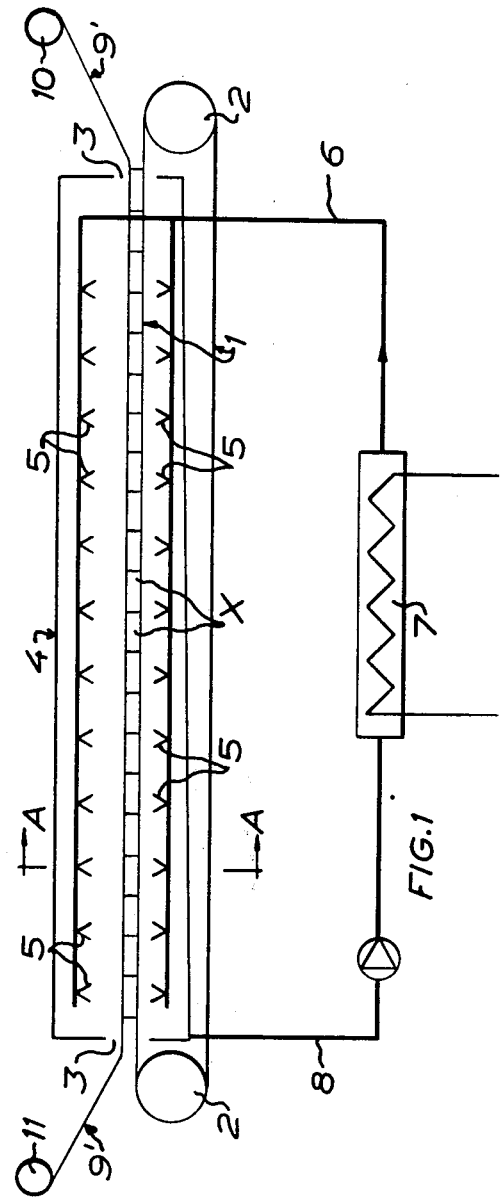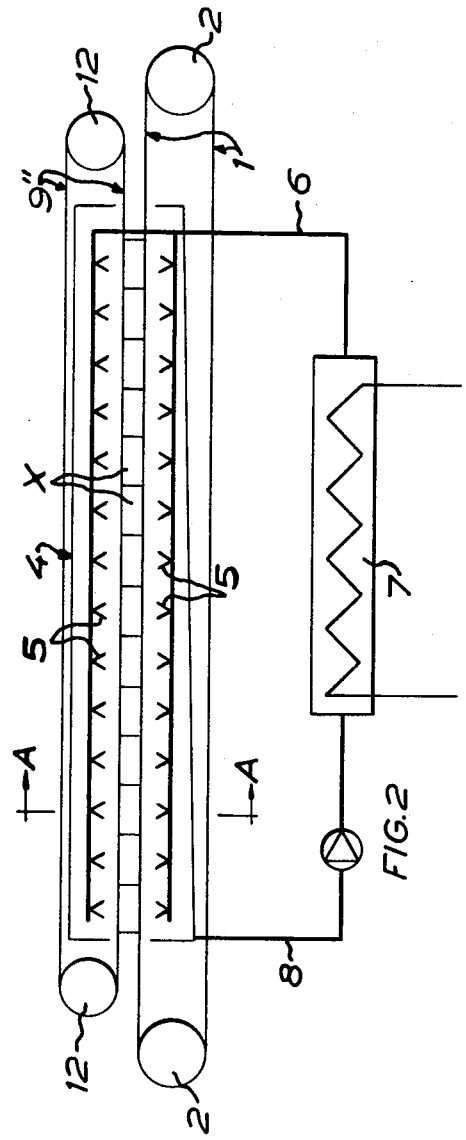

METHOD OF THERMALLY TREATING UNPACKAGED FOOD PRODUCTS

This is a continuation, of application Ser. No. 876,815 filed Feb. 10, 1978, now abandoned.

The present invention relates to a method for heat treatment, such as thawing or cooling/freezing of exposed, unpackaged products, especially food products, by means of a fluid, especially liquid, causing the products to exchange heat.

A type of heat treatment, often operated on an industrial scale, is thawing of deep-frozen food products. For this purpose various methods are used, among which there may be mentioned, for example, treatment with stationary or circulating hot air, circulating cold or hot water and dielectric heating.

However, conventional methods involve obvious drawbacks, and air treatment, for instance, results in drying of the surface layers of the products while direct treatment with water results in leaching and undesired disintegration or dissolution of the product.

In the opposite case, i.e. when lowering the temperature of the products and especially when such a decrease lies within temperature ranges where the product has not yet passed from a plastic to a solidified state, the problems encountered are very much the same. Thus, for example, air treatment with current cold air may cause drying and liquid treatment may cause leaching or at least partial disintegration or dissolution of the product or its outer portions.

The object of the invention is to provide a method which, while retaining the undeniable advantages from the point of view of heat transfer which are associated with the utilization of a fluid as a heat treatment agent, overcomes at the same time the disadvantages entailed therewith.

The new method is characterized by the following steps: placing the products on a tight support in the form of a conveyor belt or like means of high thermal conductivity; covering the products with a thin, fluid-tight and readily flexible covering layer which is movable in parallel with the conveyor belt and has a width greater than that of the product resting on the support; flushing the underside of the support with fluid of a temperature different from that of the products while flushing under pressure also the top side of the covering layer with such a fluid, said covering layer being caused to closely follow the free surfaces of the products and adjacent portions of the support under the influence of the mass and movement of the fluid, so as to maximize the area over which heat exchange with the fluid takes place, at the same time as the covering layer prevents the fluid from coming into contact with the product.

The apparatus for carrying out the method is characterized in that it comprises a conveyor belt formed of material of high thermal conductivity which is accessible for flushing with fluid from below as well as from above, and a thin, fluid-tight and readily flexible covering layer which can be placed upon said conveyor belt, covering said products, is movable in parallel therewith and has a width greater than that of the products resting on the conveyor belt.

The method according to the invention will be described in more detail hereinbelow with reference to the accompanying drawings which illustrate two preferred embodiments of apparatuses for carrying out the method and in which:

FIG. 1 is a schematic side elevation of one embodiment;

FIG. 2 is a schematic side elevation of the other embodiment; and

Figure 3:
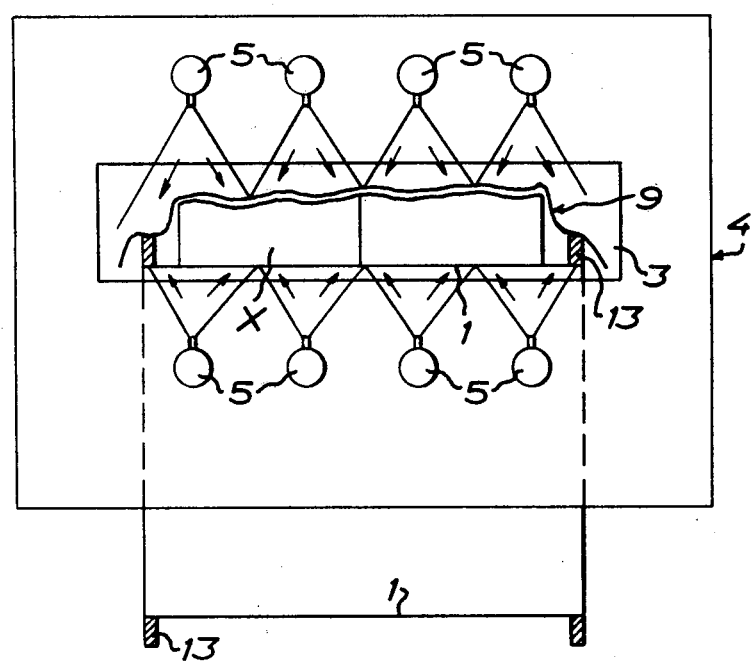
FIG. 3 is a schematic cross-sectional view on a larger scale on the plane A—A in FIG. 1 or 2.

A endless conveyor belt 1 of stainless steel or equivalent material runs over end rollers 2 arranged at either end of a chamber 4, represented by thin lines in the drawings, which is closed but has an opening 3 at either end. The forward run of the belt 1, which carries the products X, passes through the chamber 4 while the return run preferably passes outside the chamber, as shown. Arranged within the chamber 4, over and under the belt 1, is a number of flushing nozzles 5 for tempered fluid and these are connected to a supply conduit 6 for fluid from a heat exchanger 7 or like means in which the fluid will be given the intended temperature. A discharge or return conduit 8 is joined to the sloping bottom of the chamber 4 and via this conduit the water spurted out into the chamber is returned to the heat exchanger 7.

According to the invention a covering layer 9 of thin, water-proof and readily flexible material is placed on the conveyor belt 1. In the embodiment of FIG. 1 the covering layer 9 consists of a web of film 9' which is unrolled from a roller 10, travels in parallel with the conveyor belt 1 and is rolled up on a roller 11. The film web may be of the disposable or reusable type.

In the embodiment according to FIG. 2 the covering layer is in the form of an endless band 9" passing over end rollers 12.

As is clearly apparent from FIG. 3, the covering layer 9 of the preferred embodiment is wider than the conveyor belt 1 so that the covering layer may hang down at the edges of the conveyor belt. To prevent parts of the product, such as brine, meat-juice or like substances, to flow over the belt edges said belt is provided with raised edges 13, suitably in the form of rubber or like beads vulcanized thereon.

As the fluid via the nozzles 5 situated over the belt will be supplied under pressure the covering layer 9 will be pressed down against the top side and edge surfaces of the products X, which gives a large contact surface for the fluid and good heat transfer. With the apparatus according to the invention the products X will be entirely covered by the covering layer which under the influence of the fluid supplied closely follows the configuration of the products. Due to the insignificant thickness of the material of the covering layer the heat transfer between the fluid and the product, and inversely, is not prevented to any provable extent. Large quantities of fluid can be supplied, e.g. deep frozen products can be thawed in a considerably shorter time that what is possible with previously known methods, without any risk of leaching or dissolution phenomena.

As substances emanating from the products are retained on the belt and cannot mix with the fluid, this fluid can be allowed to circulate and thus be used repeatedly. The consumption of fluid, which represents a not insignificant cost item, can thus be kept on an acceptable level.

The illustrated apparatus is primarily intended for use in thawing deep-frozen products but it is obvious that it may just as well be utilized for cooling and/or freezing of products.

The fluid used for thawing generally consists of hot water. Cold water or water admixed with an agent lowering the freezing point may be used for cooling. Liquified gases are generally utilized for deep-freezing but cold air or gases may also be utilized to this effect.

The invention should not be considered restricted to that which is described above and shown in the drawings but may be modified in various ways within the scope of the appended claims.

What we claim and desire to secure by Letters Patent is:

1. A method of thermally treating exposed, unpackaged food products, comprising the steps of
    placing the products on a support in the form of a conveyor belt of high thermal conductivity;
    moving as a continuous web, a thin, fluid-tight and readily flexible covering layer, which has a width greater than that of the products resting on the support, in unison with said support;
    draping the products on the support under the continuous web covering layer so as to prevent fluid from coming into contact with the products;
    flushing the underside of the support while simultaneously flushing under pressure the top side of the continuous web covering layer with a fluid which has a temperature different from that of the products, which fluid exchanges heat with the products by supplying heat to or removing heat from the products;
    pressing the continuous web covering layer flushing under pressure its top side to move the web to closely follow the free surfaces of the products and be adjacent to portions of the support so as to maximize the area over which heat exchange with the fluid takes place;
    undraping the products on the support; and then
    winding the continuous web over a roller.

2. The method of claim 1 wherein
    the continuous web wound over a roller is also wound upon said roller.

3. The method of claim 1 wherein
    the continuous web is an endless belt also winding over a second roller.

4. The method of claim 1 wherein
    the continuous web is draped over the sides of the support.

* * * * *